United States Patent [19]

Macht

[11] Patent Number: 4,951,466
[45] Date of Patent: Aug. 28, 1990

[54] WARM-UP CONTROL FOR TRANSMISSION HYDROSTATIC UNIT

[75] Inventor: Jon A. Macht, Pittsfield, Mass.

[73] Assignee: General Electric Company, Pittsfield, Mass.

[21] Appl. No.: 364,945

[22] Filed: Jun. 12, 1989

[51] Int. Cl.⁵ .............................................. F16H 59/72
[52] U.S. Cl. .................................... 60/329; 60/394; 60/464
[58] Field of Search ................... 60/329, 464, 468, 488, 60/394, 399

[56] References Cited

U.S. PATENT DOCUMENTS

| Re. 29,672 | 6/1978 | Van Gerpen | 60/445 |
|---|---|---|---|
| 2,906,518 | 9/1959 | Kelley | 60/329 |
| 3,922,856 | 12/1975 | Bosch | 60/464 |
| 4,047,578 | 9/1977 | Appleman | 60/489 X |
| 4,126,993 | 11/1978 | Grattapaglia et al. | 60/329 |
| 4,167,853 | 9/1979 | Hamma et al. | 60/329 |
| 4,332,134 | 6/1982 | Cochran et al. | 60/464 |
| 4,373,869 | 2/1983 | Appleman | 60/489 X |
| 4,426,194 | 1/1984 | Pollman | 60/329 X |

Primary Examiner—Edward K. Look
Assistant Examiner—George Kapsalas
Attorney, Agent, or Firm—Bailin L. Kuch; Robert A. Cahill

[57] ABSTRACT

To inhibit potentially damaging cold startup of a hydrostatic unit in a vehicle transmission, a portion of the makeup fluid pump to the hydraulic pump and motor loop circuit of the hydrostatic unit is directed through a branch line including a viscosity insensitive, flow regulating fluidic element and a viscosity sensitive fluidic element. The latter element develops a fluidic signal varying as a function of fluid viscosity, which is utilized to control a valve to prevent over-pressurization of the loop circuit and to control a transmission controller to condition the transmission to neutral until the hydraulic fluid warms to a safe operating viscosity.

16 Claims, 1 Drawing Sheet

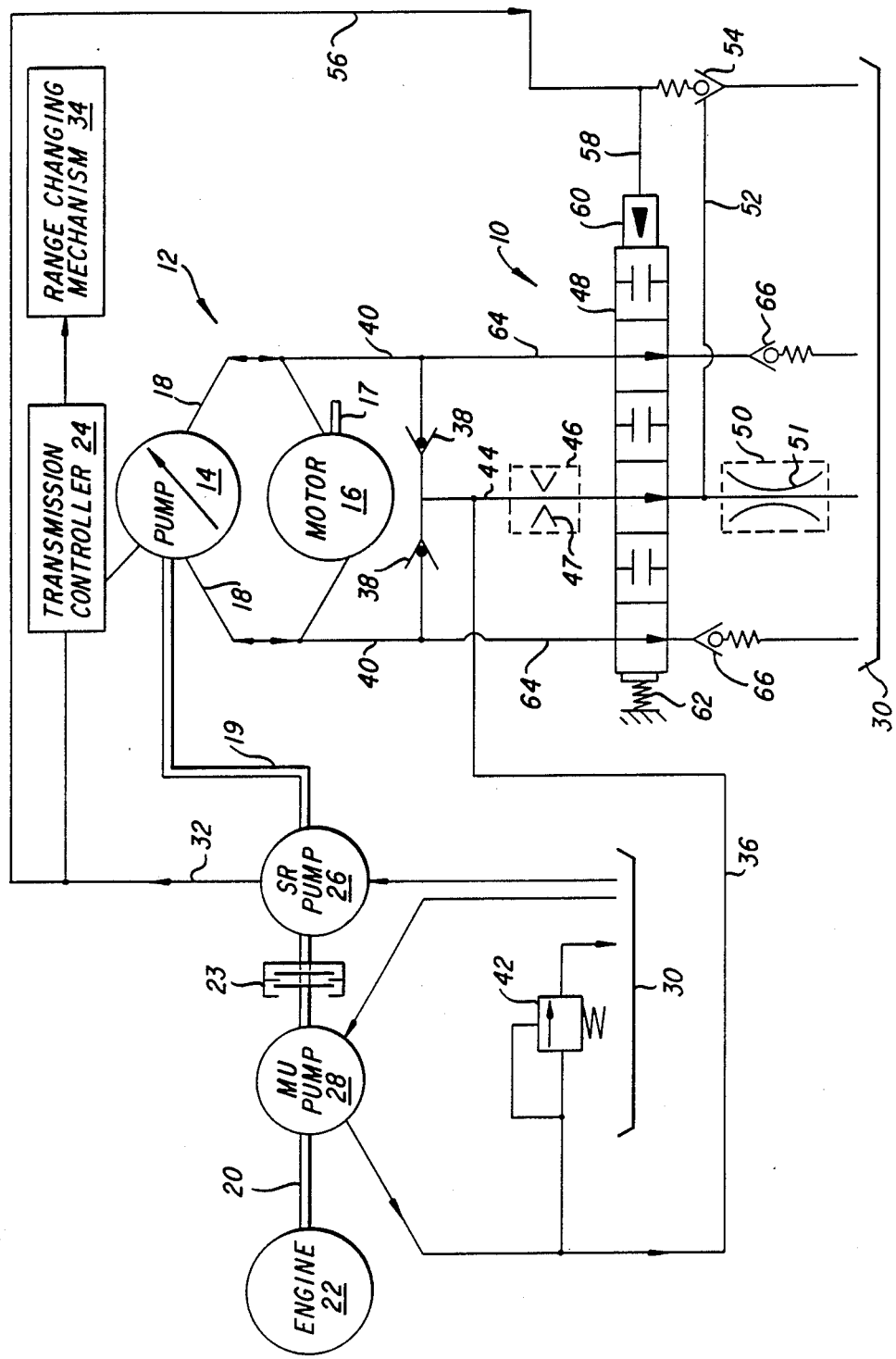

WARM-UP CONTROL FOR TRANSMISSION HYDROSTATIC UNIT

This invention was made with U.S. Government support under DAAE07-86-C-R046 awarded by the Department of Army. The U.S. Government has certain rights in this invention.

BACKGROUND OF THE INVENTION

The present invention relates to hydrostatic drive systems and particularly to a control for protecting hydrostatic drive units of vehicle transmissions from cold weather startup damage.

Hydrostatic drive systems, such as hydrostatic transmissions and hydrostatic drive units in hydromechanical transmissions, are designed to operate safely with hydraulic fluids having a viscosity within a predetermined range. If the temperature of the hydraulic fluid is extremely low, its viscosity increases to the point where it does not properly flow through hydraulic circuits. A hydraulic pump, driven by the vehicle engine, in pumping cold, highly viscous hydraulic fluid, can over-pressurize the hydraulic circuit. Moreover, the hydraulic pump and hydraulic motor in the hydraulic circuit are not adequately lubricated when the hydraulic fluid is too cold. Due to differentials in expansion coefficients, clearances between component parts subjected to extremely low temperature hydraulic fluid can go out of tolerance. All of these factors have the potential of causing transmission malfunctioning at the least or, at the worst, permanent damage to hydraulic components if the vehicle, after standing long periods in extremely cold weather, is driven without an adequate hydraulic fluid warm-up period.

One approach to avoiding potentially damaging cold startups has been to utilize auxiliary heaters to warm the hydraulic fluid to an acceptable viscosity or to drive the transmission at a low idle speed to produce circulation and thus warming of the hydraulic fluid. Vehicle propulsion is inhibited until a thermostatic element senses that the hydraulic fluid temperature has risen to a safe operating level. An auxiliary heater requires an auxiliary energy source which is likely not be available in the field. Moreover, thermostatic elements are not particularly reliable when subjected to the hostile environment within a transmission housing.

SUMMARY OF THE INVENTION

It is accordingly an object of the present invention to provide an improved control for inhibiting potentially damaging cold startup of a hydraulic drive system.

An additional object is to provide a control of the above character wherein hydraulic propulsion is automatically inhibited for a period sufficient to allow the system hydraulic fluid to be warmed to a safe viscosity level.

A further object is to provide a warm-up control of the above character wherein the appropriate warm-up period is determined by sensing the viscosity of the hydraulic fluid.

Another object is to provide a warm-up control of the above-character, which is implemented to a vehicle hydrostatic transmission or to the hydrostatic unit of a vehicle hydromechanical transmission.

A still further object is to provide a warm-up control of the above-character, which is inexpensive to manufacture, takes up minimal space within the transmission housing, and is readily implemented with existing transmission controllers.

Other objects of the invention will in part be obvious and in part appear hereinafter.

In accordance with the present invention, there is provided an improved control for inhibiting cold startup propulsion of a hydraulic drive system, such as a hydrostatic transmission unit in a vehicle, until the hydraulic fluid has been warmed to a safe operating viscosity. The control utilizes a flow regulated portion of the hydraulic makeup fluid delivered by an engine-driven makeup pump to the hydraulic pump and motor loop circuit of the hydrostatic transmission unit, which regulated flow portion is directed through a viscosity sensitive fluidic element, such as an orifice or capillary tube of suitable length, to the transmission sump. The resulting pressure drop or back pressure imposed by this fluidic element is a function of hydraulic fluid viscosity and is applied as a fluidic signal to control the position of a valve. As long as this valve is held open in response to a fluidic signal indicative of an unsafe hydraulic fluid viscosity, hydraulic fluid is bled from the hydraulic pump and motor loop circuit to inhibit excessive hydraulic pressures therein. Moreover, while the valve is held open, depression is imposed on an engine speed reference signal supplied to a transmission controller, such that the controller forces the transmission to an essentially neutral condition. Thus, vehicle propulsion is inhibited regardless of the engine speed commanded by the driver.

After the hydraulic fluid has been sufficiently circulated by the makeup pump and the hydraulic pump to warm the fluid to a safe operating viscosity, the viscosity fluidic signal will fall to a magnitude allowing the valve to close. Hydraulic fluid is no longer bled from the hydraulic pump and motor loop circuit, and depression of the engine speed reference signal is terminated. Vehicle propulsion in full response to driver commands is thus enabled without damaging consequences to the hydrostatic transmission unit.

The invention accordingly comprises the features of construction, arrangement of parts and combination of elements, all of which will be exemplified in the following description, and the scope of the invention will be indicated in the claims.

BRIEF DESCRIPTION OF THE DRAWING

For a full understanding of the nature and objects of the invention, reference may be had to the following Detailed Description taken in conjunction with the drawing in which the sole figure is a circuit schematic diagram illustrating an embodiment of the warm-up control of the invention adapted to a vehicle hydrostatic transmission unit.

DETAILED DESCRIPTION OF THE PREFERRED EMBODIMENT

The warm-up control of the invention, generally indicated at 10 in the sole drawing figure, is illustrated in its application to a hydrostatic unit, generally indicated at 12, of a hydromechanical transmission of the type disclosed in commonly assigned, Reed U.S. Pat. No. 4,799,401 utilized in track-laying or skid-steered wheeled vehicles. As recognized in the art, such transmissions utilize two such hydrostatic units whose hydrostatic outputs are applied in parallel with a mechanical output to range changing, combining gear sets to provide right and left transmission propulsion outputs.

The two hydrostatic outputs are typically commonly varied to accommodate infinitely varying vehicle speeds within each transmission range and differentially varied to effect vehicle steering. However, it will be appreciated that the present invention can be advantageously applied to a pure hydrostatic transmission.

As seen in the drawing, hydrostatic unit 12 includes a variable displacement hydraulic pump 14 and a typically fixed displacement hydraulic motor 16 connected in a loop circuit 18. The pump is driven by a shaft 19 which is engageable with the output shaft 20 of the vehicle engine 22 through a clutch 23 to pump hydraulic fluid through this loop circuit in either direction at a variable rate established by a transmission controller 24 to produce a bidirectional hydrostatic output of varying speed on hydraulic motor output shaft 17.

In accordance with conventional practice, engine 22 also drives a small speed reference pump 26 and a hydraulic fluid makeup pump 28. The speed reference pump, driven via clutch 23 and shaft 19, draws hydraulic fluid from the transmission sump 30 and discharges the fluid to the transmission controller via signal or pilot line 32 at a pressure proportional to the engine RPM developed on its output shaft 20. The transmission controller uses this fluidic signal to adjust the displacement (typically referred to as "stroke") of hydraulic pump 14 and to condition range changing mechanism 34 to an appropriate transmission range such as to achieve optimum performance consistent with the speed command issued by the vehicle operator.

Makeup pump 28, driven directly off of engine shaft 20, draws hydraulic fluid from sump 30 and pumps it over a makeup line 36 to the junction between a pair of opposed check valves 38 connected into the two sides of hydraulic loop circuit 18 via lines 40. When the hydraulic pressure in this loop circuit falls below a predetermined magnitude occasioned by hydraulic fluid losses due to leakages in the hydraulic pump and motor, one or the other of check valves 38 will open to admit hydraulic fluid into the loop circuit to make up the fluid loss. Makeup fluid pressure in line 36 is controlled by a regulator 42.

To adapt warm-up control 10 to the known transmission configuration described above, a portion of the makeup hydraulic fluid in line 36 is directed through a branch line 44 which leads to transmission sump 30. Serially included in this branch line are a viscosity insensitive, flow regulating fluidic element 46, one valve port of a spool valve 48 and a viscosity sensitive fluidic element 50. Element 46 may conveniently take the form of an extremely short, i.e. sharp, orifice 47 which is effective in regulating hydraulic fluid flow therethrough regardless of its viscosity. Element 50, on the other hand, may take the form of a capillary tube or long orifice 51 which, in response to hydraulic fluid flow therethrough, produces a pressure drop which varies as a function of fluid viscosity. This pressure drop is applied as a fluidic signal via signal line 52 to control a relief valve 54 whose outlet is directed to transmission sump 30. The inlet of this relief valve is connected to one end of a signal line 56 whose other end is tapped into speed reference signal line 32 ahead of transmission controller 24. Tapped into signal line 56 is a branch signal line 58 which is utilized to actuate the spool 60 of spool valve 48. This spool is biased rightwardly by a spring 62 such that its valve ports are normally open to accommodate hydraulic fluid flow therethrough.

Completing the description of warm-up control 10, a separate branch line 64 is connected into each of the two sides of hydraulic loop circuit 18 via lines 40 to bleed hydraulic fluid therefrom through the remaining two normally open valve ports of control valve 48 to transmission sump 30. Relief valves 66 may be included in branch lines 64 to maintain a predetermined minimum pressure in the hydraulic loop circuit during startup while valve 48 is open.

From the foregoing description, it is seen that, when engine 22 is started with clutch 23 disengaged, branch lines 44 and 64 are open to the transmission sump through the normally open valve ports of control valve 48. Pump 28 builds up pressure in makeup line 36 to the level set by regulator 42, and makeup hydraulic fluid flows through branch line 44. This flow is regulated by the viscosity insensitive sharp orifice 47 and, upon flowing through long orifice 51, develops the viscosity fluidic signal via signal line 52 to relief valve 54. If the hydraulic fluid viscosity is in the safe operating range, the pressure drop across the long orifice, as reflected in this viscosity signal, is insufficient to unseat relief valve 54. Consequently, when clutch 23 is engaged to drive speed reference pump 26 and hydraulic pump 14, the full value of the speed reference pump signal is communicated via signal lines 56 and 58 to valve spool 60, causing it to shift leftward, closing the three valve ports of valve 48. Branch lines 64 are thus valved off, permitting the hydraulic loop circuit to be pressurized by the pumping action of pump 14 and the motor 16 to be driven to produce a vehicle-propelling hydrostatic output on shaft 17. The hydrostatic unit 12 thus functions normally under the control of transmission controller in full response to operator speed commands. It is noted that line 44 is also valved off to inhibit unnecessary loss of make-up fluid.

However, if the engine is started while the hydraulic fluid is excessively cold such that its viscosity exceeds the safe operating range, the pressure of the viscosity signal developed by the long orifice will be of sufficient magnitude to open relief valve 54. This action is effective to depress the speed reference signal seen by both valve spool 60 and the transmission controller when clutch 23 is engaged. The ports of control valve 48 are thus held open by spring 62, and over pressurization of hydraulic loop circuit 18 by pump 14 is precluded by open branch lines 64. In addition, monitoring of the viscosity of hydraulic fluid flow through branch line 44 continues. Insofar as the transmission controller is concerned, depression of the speed reference signal is interpreted as a much lower speed command than the vehicle operator has in fact issued. Consequently, the transmission controller down-shifts the range changing mechanism 34 to low range, which is typically a strictly hydrostatic propulsion range, and down-strokes the hydraulic pump to a low displacement consistent with any residual steer command.

Thus an essentially neutral condition is imposed on the transmission, and vehicle propulsion is substantially inhibited as long as the viscosity signal holds relief valve open to avoid potentially damaging stresses to hydrostatic unit 12. As hydraulic fluid continues to be circulated by pumps 14 and 28, its temperature is elevated in the process. After a sufficient warm up period, the hydraulic fluid viscosity will have dropped into the safe operating range. This event is sensed by long orifice 51 in that the pressure of its viscosity signal falls to a magnitude insufficient to maintain relief valve 54 open. When this valve reseats, the depression imposed on the speed reference signal is removed, and spool 60 is positioned to close off the ports of control valve 48. Hydraulic fluid flow through branch lines 44 and 64 is shut down, and normal safe operation of hydrostatic unit 12 is enabled.

It will be appreciated that the precise characteristics of the viscosity insensitive, flow regulating fluidic element 46 and the viscosity sensitive fluidic element 50 in branch line 44 must be tailored to the particular transmission design to which warm-up control 10 is adapted. Other factors to be considered are the type of hydraulic fluid to be used, the separation between elements 46 and 50, and the signal pressure response characteristics of relief valve 54. It will be appreciated that the order in which elements 46 and 50 and the spool valve port are serially arranged in branch line 44 may be varied as long as element 46 is upstream of element 50. In the case of skid-steered vehicle transmissions employing a pair of hydrostatic units, either an additional speed reference signal actuated control valve or additional valve ports would be included in a single control valve to handle branch lines 64 from both units.

While, in normal situations, the vehicle operator is automatically conditioned to wait out the requisite warm-up period imposed by control 10 before normal vehicle propulsion can begin, an emergency over-ride is available simply by moving the steer control to an extreme skid-steer maneuver position. This increases the hydraulic pump displacements to the point where all the makeup fluid is drawn into the hydraulic loop circuit through one of the check valves 38, leaving little left to flow through branch line 44. Consequently, the viscosity pressure signal is suppressed, and relief valve 54 is not opened. The full speed reference signal is thus available to effect closure of the control valve ports. The hydrostatic unit can then be pressurized, albeit unsafely, to produce vehicle propulsion.

It is seen from the foregoing that the objects set forth above, including those made apparent from the preceding description, are efficiently attained, and, since certain changes may be made in the construction set forth, it is intended that matters of detail be taken as illustrative and not in a limiting sense.

I claim:

1. A warm-up control for a hydrostatic propulsion unit including a hydraulic pump driven by an engine and a hydraulic motor connected in hydraulic loop circuit with the hydraulic pump, said warm-up control including, in combination:
   (A) a makeup pump driven by the engine for pumping hydraulic fluid from a sump through a fluid makeup line to the hydraulic loop circuit to replenish fluid leakage losses therefrom;
   (B) at least one bleed line for removing hydraulic fluid from the hydraulic loop circuit to limit pressure buildup therein;
   (C) a control valve connected in said one bleed line;
   (D) a hydraulic fluid viscosity monitoring line connected to said makeup line and including at least one fluidic element for developing a viscosity fluidic signal indicative of the viscosity of the hydraulic fluid flowing therethrough; and
   (E) means responsive to said viscosity fluidic signal for maintaining said control valve open until the hydraulic fluid viscosity decreases to a safe operating range.

2. The warm-up control defined in claim 1, wherein said fluid viscosity monitoring line further includes a second fluidic element for regulating the flow of hydraulic fluid through said one fluidic element.

3. The warm-up control defined in claim 2, wherein said control valve includes a first valve port connected in said fluid viscosity monitoring line and second valve port connected in said bleed line.

4. The warm-up control defined in claim 2, wherein said second fluidic element is an orifice configured to regulate hydraulic fluid flow therethrough to a uniform rate regardless of its viscosity.

5. The warm-up control defined in claim 4, wherein said one fluidic element is an orifice configured to create, in response to hydraulic fluid flow therethrough, a pressure drop varying as a function of fluid viscosity, said viscosity fluidic signal being indicative of said pressure drop.

6. The warm-up control defined in claim 5, wherein said control valve includes a first valve port connected in said fluid viscosity monitoring line and second valve port connected in said bleed line.

7. The warm-up control defined in claim 6, wherein said bleed line is a first bleed line connected into one side of the hydraulic loop circuit, said warm-up control further including a second bleed line connected into the other side of the hydraulic loop circuit, and said control valve having said second valve port connected in said first bleed line and further including a third valve port connected in said second bleed line.

8. A warm-up control for a vehicle transmission including a hydrostatic propulsion unit having a hydraulic pump mechanically driven by an engine and a hydraulic motor connected in a hydraulic loop circuit with the hydraulic pump, said warm-up control comprising, in combination:
   (A) a speed reference pump driven by the engine for developing a first fluidic signal proportional to engine speed in an output line;
   (B) a transmission controller connected with said speed reference pump output line and responsive to said first fluidic signal;
   (C) a makeup pump driven by the engine for pumping hydraulic fluid from a transmission sump through a fluid makeup line to the hydraulic loop circuit of the hydrostatic unit to replenish fluid leakage losses therein;
   (D) a normally closed relief valve included in a signal line tapped into said speed reference pump output line ahead of said transmission controller;
   (E) a bleed line for withdrawing hydraulic fluid from the hydraulic loop circuit to inhibit over-pressurization thereof;
   (F) a normally open control valve included in said bleed line and operable to close in response to said first fluidic signal in said signal line; and
   (G) a fluid viscosity monitoring line connected into said makeup line and including first fluidic means for regulating hydraulic fluid flow therethrough to a uniform rate regardless of its viscosity and second fluidic means for developing a second fluidic signal varying as a function of the viscosity of the hydraulic fluid flowing therethrough, said second fluidic signal being applied to maintain said relief valve open until the hydraulic fluid is warmed to a safe viscosity operating range, said relief valve, while open, depressing said first fluidic signal to a level insufficient to close said control valve.

9. The warm-up control defined in claim 8, wherein said transmission controller operates in response to the depression of said first fluidic signal by said relief valve to control the vehicle transmission to an essentially neutral operating condition.

10. The warm-up control defined in claim 9, wherein said control valve includes a first valve port connected in said fluid viscosity monitoring line and second valve port connected in said bleed line.

11. The warm-up control defined in claim 10, which further includes a clutch, said make up pump being directly driven by the engine, and said speed reference pump and the hydraulic pump being driven by the engine through said clutch.

12. The warm-up control defined in claim 9, wherein said first fluidic means is an orifice configured to regulate hydraulic fluid flow therethrough to a uniform rate regardless of its viscosity.

13. The warm-up control defined in claim 12, wherein said second fluidic means is an orifice configured to create, in response to hydraulic fluid flow therethrough, a pressure drop varying as a function of fluid viscosity, said second fluidic signal being indicative of said pressure drop.

14. The warm-up control defined in claim 13, wherein said bleed line is a first bleed line connected into one side of the hydraulic loop circuit, said warm-up control further including a second bleed line connected into the other side of the hydraulic loop circuit, and said control valve having a first valve port connected in said first bleed line, a second valve port connected in said second bleed line, and a third valve port connected in said fluid viscosity monitoring line.

15. The warm-up control defined in claim 14, which further includes a pair of check valves serially interconnected in opposed flow relation into the two sides of the hydraulic loop circuit, said make-up line terminating at a junction between said check valves, whereby hydraulic fluid is admitted through said check valves when necessary to replenish the hydraulic fluid in the hydraulic loop circuit.

16. The warm-up control defined in claim 14, which further includes an additional relief valve in each said first and second bleed lines.

* * * * *